(12) United States Patent
Rambler (10) Patent No.: US 9,053,373 B2
(45) Date of Patent: Jun. 9, 2015

(54) METHOD AND APPARATUS FOR ASSESSING THE HEALTH OF AN IMAGE CAPTURE DEVICE IN AN OPTICAL CODE SCANNER

(71) Applicant: Jason Rambler, Decatur, GA (US)

(72) Inventor: Jason Rambler, Decatur, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/038,013

(22) Filed: Sep. 26, 2013

(65) Prior Publication Data

US 2015/0083806 A1    Mar. 26, 2015

(51) Int. Cl.
*G06K 7/00*    (2006.01)

(52) U.S. Cl.
CPC .................... *G06K 7/0095* (2013.01)

(58) Field of Classification Search
CPC ....................................... G06K 7/0095
USPC .................................. 235/437, 438
See application file for complete search history.

(56) References Cited

U.S. PATENT DOCUMENTS

| 3,663,800 | A | * | 5/1972 | Myer et al. ..................... 235/437 |
| 5,440,142 | A | * | 8/1995 | Maddox ....................... 250/566 |
| 5,493,213 | A | * | 2/1996 | Collins et al. ............ 324/750.18 |
| 8,464,951 | B2 | * | 6/2013 | Trajkovic et al. ............. 235/454 |

* cited by examiner

*Primary Examiner* — Jamara Franklin
(74) *Attorney, Agent, or Firm* — Harden E. Stevens, III (57) ABSTRACT

An image based optical code scanner is presented that determines the health of each of a plurality of image capture devices located within the optical code scanner. The optical code scanner first determines a baseline performance for each of the image capture devices by capturing statistics for each of the image capture devices during item scanning operations. The optical code scanner then periodically determines the current performance of each of the image capture devices and compares it with the baseline performance. An alert message is generated if the current performance of any image capture device falls below its baseline performance.

9 Claims, 5 Drawing Sheets

METHOD AND APPARATUS FOR ASSESSING THE HEALTH OF AN IMAGE CAPTURE DEVICE IN AN OPTICAL CODE SCANNER

FIELD OF THE INVENTION

The present invention relates to optical code scanners that use image capture devices and more specifically to methods and an apparatus for assessing the health of the image capture devices.

BACKGROUND

Optical code scanners are used in point of sale (POS) terminals to read optical codes on items which are presented to the POS terminals for purchase as part of a purchase transaction. An image based optical code scanner may suitably use multiple image capture devices to capture images of a space above the optical code scanner through which items are passed for scanning. Each captured image is processed to detect and decode any optical code that was captured in the image. Optical code scanners use multiple image capture devices to maximize the area of coverage above the optical code scanner. As an optical code passes through the area of coverage for the optical code scanner, it is possible that multiple image capture devices will capture an image of the optical code and be able to decode it. When a first image capture device fails or experiences degraded performance, other image capture devices will typically still be able to read the optical code. While the ability to still read the optical code helps to maintain the overall performance of the optical code scanner, it masks the fact that an image capture device has failed or is experiencing degraded performance. However at some point, for example when a second or a third image capture device fails or experiences degraded performance, the optical code scanner may suddenly fail or experience a major reduction in performance that causes it to be taken out of service.

SUMMARY

Among its several aspects, the present invention seeks to overcome or ameliorate at least one of the disadvantages of the prior art, or to provide a useful alternative.

Among its several aspects, the present invention recognizes there is a need in an image based optical code scanner to diagnose a full or partial failure of one or more image capture devices prior to failure of the optical code scanner. An image based optical code scanner typically uses multiple image capture devices to read optical codes presented to the optical code scanner for scanning. A single image capture device can degrade or fail and the optical code scanner will still be able to function using the other image capture devices, but the overall performance of the optical code scanner will be reduced. However, the operator may not be able to detect the reduction in performance until additional image capture devices fail or degrade possibly taking the optical code scanner out of service. The present invention recognizes that there is an advantage to being able to quickly determine when one or more of the image capture devices fail or experiences a reduction in performance prior to the failure of the optical code scanner.

Among its several aspects, the invention further recognizes that when an image capture device experiences a failure or a reduction in performance, the cause may be an optical obstruction between the image capture device and its field of view and that by sending an alert notice to an operator, the operator may be able to remove the optical obstruction and quickly return the image capture device to full performance. The optical obstruction may be something as simple as a dirty scanning window. Once the operator is alerted to the problem, the operator can perform routine maintenance such as cleaning one or more of the external optical surfaces which may restore full performance to the image capture device. Otherwise, a service call must be scheduled.

In accordance with the teachings of the present invention, an image based optical code scanner is provided that monitors the performance of each image capture device within the optical code scanner. The optical code scanner first monitors the performance of each of the image capture devices during item scanning operations to gather data that represents a baseline performance for each of the image capture devices. This data is gathered during a first data period. After the first data period ends and the baseline performance for each of the image capture devices has been established, the optical code scanner periodically gathers additional performance data in the same manner for each of the image capture devices. This data represents a snap-shot or current performance data for each of the image capture devices. This data is gathered during a second data period. After each second data period ends, the current performance data for each of the image capture devices is established and then the current performance data is compared to the baseline performance data. If the current performance for any of the image capture devices falls a predetermined amount below its baseline performance, an alert notice or message is generated and sent externally so that the message can be logged and presented to an operator or a system administrator for corrective action.

In accordance with an embodiment of the present invention, there is provided an optical code scanner. The optical code scanner comprises: a plurality of image capture devices adapted to capture images of items presented to the optical code scanner for identification; and wherein the optical code scanner is configured to determine for each of the plurality of image capture devices a first average number of good scans over a first data period, to determine for each of the plurality of image capture devices a second average number of good scans over a second data period and to generate a signal indicating a potential failure of a first of the plurality of image capture devices when the second average number of good scans for the first of the plurality of image capture devices is below the first average number of good scans for the first of the plurality of image capture devices by a predetermined amount.

In accordance with an embodiment of the present invention, there is provided a method implemented by a processor in an optical code scanner. The method comprises: reading optical codes on items presented to the optical code scanner using images captured from a plurality of image capture devices; storing a first set of statistics for each of the plurality of image capture devices when it is determined a first data period is active; starting a second data period after it is determined the first data period has expired; storing a second set of statistics for each of the plurality of image capture devices when it is determined the second data period is active; and transmitting a failure alert indication for a first of the plurality of image capture devices when the second set of statistics are below the first set of statistics for the first of the plurality of image capture devices by a predetermined amount.

In accordance with another embodiment of the present invention, there is provided a point of sale terminal. The point of sale terminal comprises: a computer adapted to control the point of sale terminal; an optical code scanner in communication with the computer, the optical code scanner comprises;

a plurality of image capture devices adapted to capture images of items presented to the optical code scanner for identification; and wherein the optical code scanner is configured to determine for each of the plurality of image capture devices a first average number of good scans over a first data period, to determine for each of the plurality of image capture devices a second average number of good scans over a second data period and to transmit a signal to the computer indicating a potential failure of a first of the plurality of image capture devices when the second average number of good scans for the first of the plurality of image capture devices is below the first average number of good scans for the first of the plurality of image capture devices by a predetermined amount.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
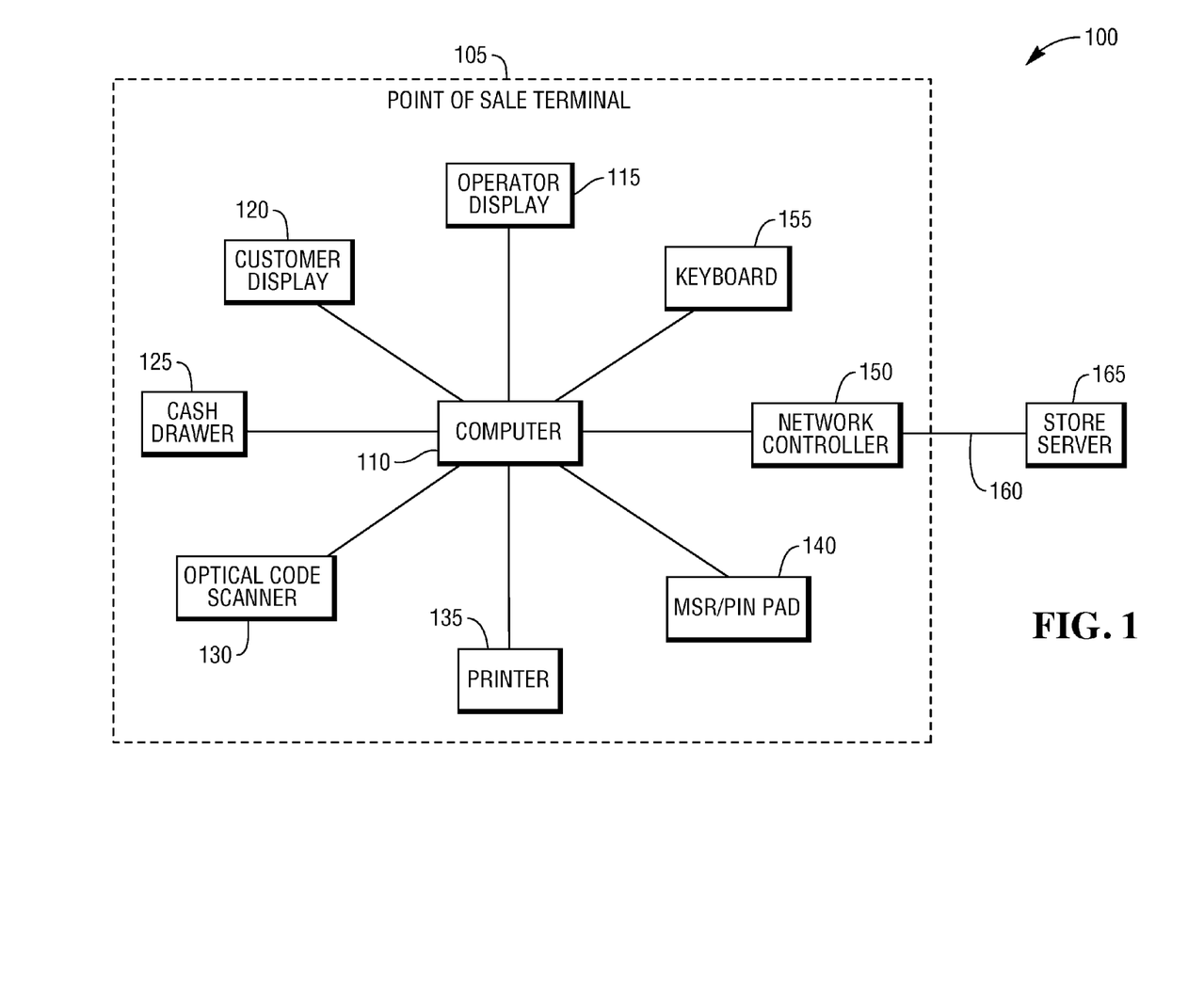
FIG. 1 is a high-level block diagram illustrating a retail point of sale system of the present invention.

With reference to FIG. 1, there is provided a high-level block diagram illustrating a point of sale system 100 including a point of sale (POS) terminal 105 that uses a network 160 to communicate with a store server computer 165. The point of sale system 100 may suitably include more than one POS terminal 105 where each POS terminal 105 communicates over the network 160 with the store server computer 165. The POS terminal 105 may be implemented as either an assisted or a customer operated POS terminal.

In this embodiment, the POS terminal 105 includes a computer 110 and a number of components and peripherals that are controlled by the computer 110. The POS terminal 105 further includes an operator display 115, a customer display 120, a cash drawer 125, an optical code scanner 130, a printer 135, a magnetic stripe reader (MSR) and personal identification number (PIN) pad 140, a network controller 150 and a keyboard 155.

Figure 2:
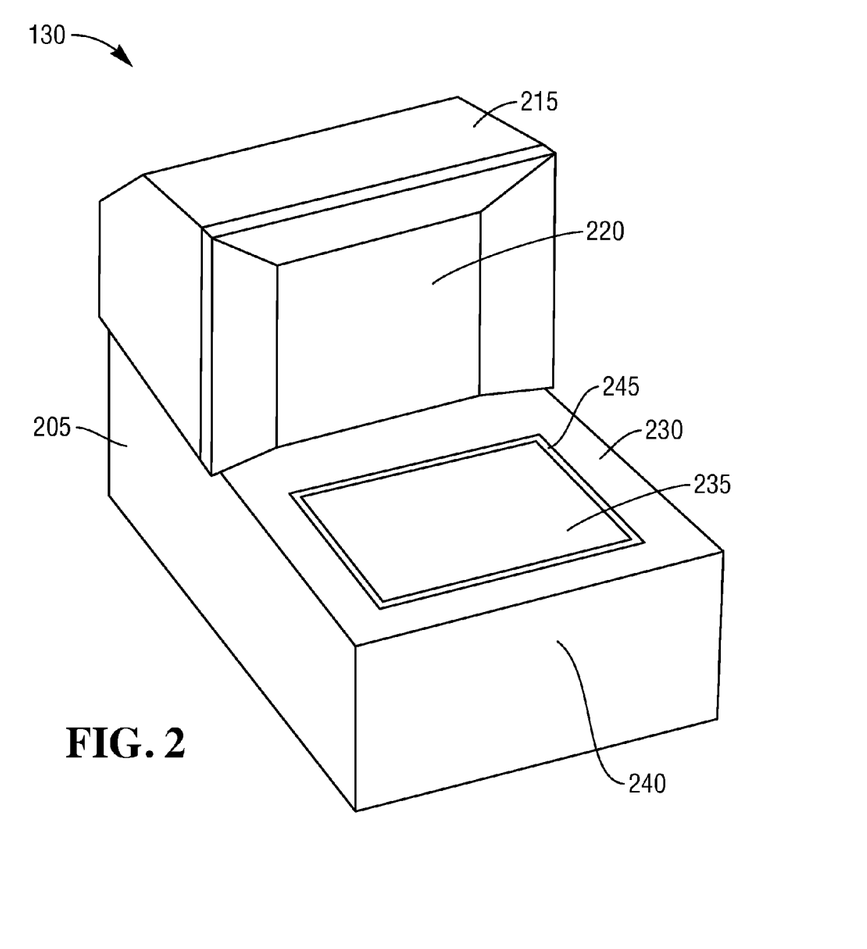
FIG. 2 is a high-level drawing illustrating an optical code scanner of the present invention.

The operator display 115 displays information used by a cashier to operate the POS terminal 105. In this embodiment, the cashier is a trained operator employed to, at least in part, operate the POS terminal 105. The keyboard 155 is used by the cashier to input data and commands to the computer 110. The cash drawer 125 is controlled by the computer 110 and stores currency, checks, coupons and the like. In some embodiments, the cash drawer 125 is replaced by an automatic cash acceptor/dispenser which is controlled by the computer 110 and accepts and dispenses currency. The optical code scanner ("scanner") 130 is used to read optical codes presented to the POS terminal 105 for identification. In some embodiments, the scanner 130 includes a weigh scale as part of a horizontal window (FIG. 2, 235). The weigh scale determines the weight of an item placed on the horizontal window 235. The customer display 120 is visible to the customer and used to display information about the transaction to the customer.

The network controller 150 has hardware and software necessary to support a connection to the local area network 160 and for the computer 110 to communicate over the local area network 160 to the store server 165 or other computers and POS terminals on the network 160 or to computers on other networks connected to the local area network 160. In some embodiments, the network controller 150 supports a transmission control protocol/internet protocol (TCP/IP) network protocol and the local area network 160 is an Ethernet network.

The MSR/PIN PAD 140 reads information from a magnetic stripe usually attached to the back of a card, such as a credit or debit card, loyalty card or the like. The PIN pad portion 140 is used to enter PIN numbers associated with a credit or debit card. The MSR/PIN Pad 140 device also includes software and hardware to communicate with an external server used to process credit transactions. The printer 135 is used to print customer receipts and other documents.

The store server 165 includes software and data used to process purchase transactions being performed at the POS terminal 105. The data includes a product lookup database that is used to identify items presented to the POS terminal 105 for purchase. When an optical code is scanned by the POS terminal 105, information read from the optical code is sent to the store server 165 and used to identify a data record in the product lookup database. The data record includes information about the item the optical code is attached to including a price and description of the item. This information is returned back to the POS terminal 105 and is used in processing a purchase transaction. The store server 165 also maintains information on all purchase transactions performed by the POS terminal 105 and can either process payment requests or contact external computer servers that will process the payment requests.

Referring now to FIG. 2, there is provided a high-level drawing illustrating an exemplar embodiment of the optical code scanner 130. The optical code scanner 130 reads optical codes presented to the optical code scanner 130. An optical code is a computer readable representation of information. In this embodiment, optical codes can be attached to or printed on an item or object or displayed on an electronic display such as the display screen of a cell phone or tablet computer. The optical code may suitably include one dimensional and two dimensional bar codes. The optical code scanner 130 can read optical codes based on symbologies that include but are not limited to: UPS, EAN, Code 128, GS1 DataBar™, Datamatrix, Aztec, QR and MaxiCode.

The scanner 130 includes the horizontal scanning window 235 and a vertical scanning window 220. The horizontal scanning window 235 is part of a weigh plate 245 that is part of a horizontal housing component 230 of the scanner 130.

The weigh plate 245 or top plate is part of a weigh scale 435 (FIG. 4) and objects are placed on the weigh plate 245 to be weighed by the weigh scale 435. The vertical scanning window 220 is housed in a vertical housing component 215 of the scanner 130 and faces an operator side 240 of the scanner 130. The side of the vertical housing component 215 that houses the vertical scanning window 220 is the front of the scanner 130 and faces the operator of the scanner 130. The two scanning windows 220, 235 are composed of an optically transparent and scratch resistant material such as hurricane glass or sapphire coated glass.

An operator scans an item by orienting an optical code on an item or device so it faces either the vertical scanning window 220 or the horizontal scanning window 235 and then moving the item past the windows. The scanner 130 produces an indication, such as an audio sound, a light, or both, once the optical code has been identified and read. The scanner 130 uses imaging technology to capture an image of the optical code and decode or read it.

In some embodiments, the scanner 130 further includes laser scanning technology that uses one or more lasers to scan and read an optical code. The laser beams from the laser are directed to form scanning patterns through the vertical scanning window 220 and the horizontal scanning window 235. When a directed laser beam strikes and moves across an object presented to the scanner 130, the object reflects a portion of the laser light. Some of the reflected laser light passes back through one of the scanning windows (220 or 235) and is directed to a photodetector that produces electrical signal data proportional to the amount of light received. The received electrical signal data is processed to detect the presence of an optical code and to recover the information associated with the optical code.

Figure 3:
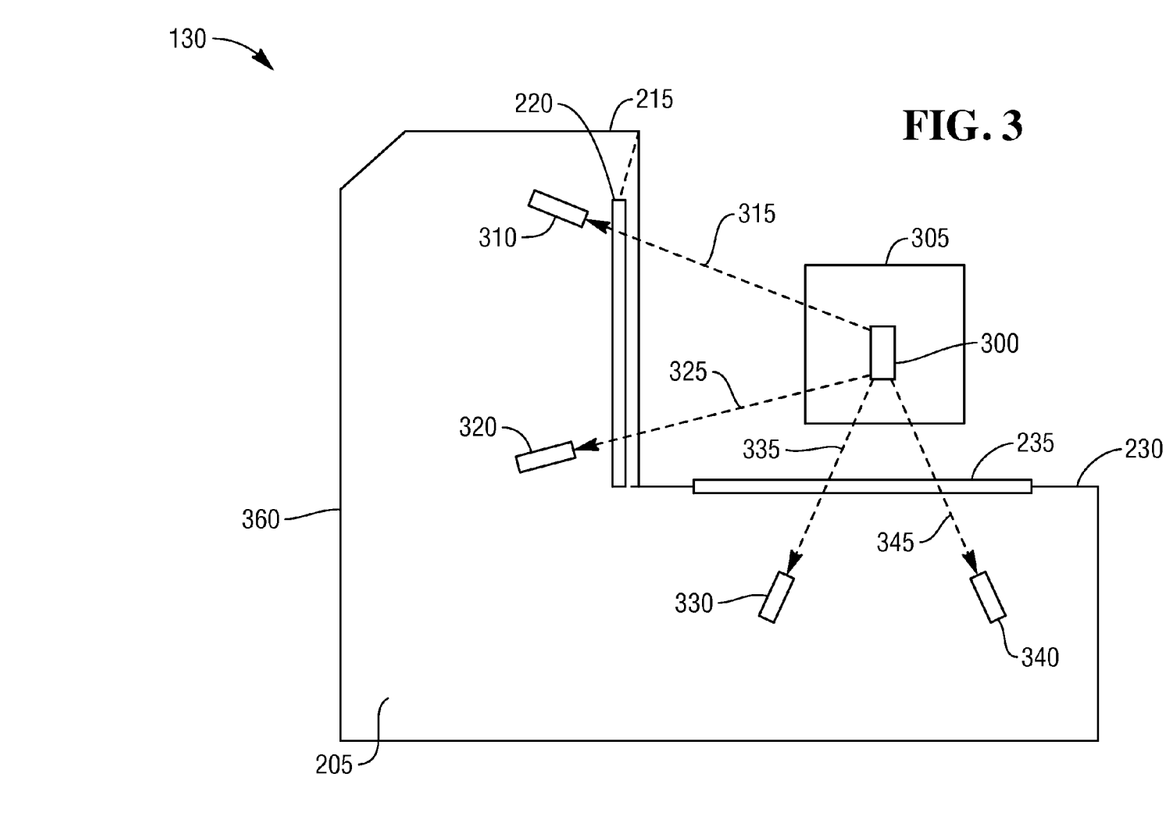
FIG. 3 is a high-level cross-sectional drawing illustrating the optical code scanner.

Referring to FIG. 3, there is provided a high-level cross-sectional drawing further illustrating the exemplar embodiment of the optical code scanner 130. The scanner 130 includes a first image capture device 310, a second image capture device 320, a third image capture device 330 and a fourth image capture device 340. The first and second image capture devices 310, 320 receive images through the vertical scanning window 220. The first image capture device 310 captures images of an object 300 along a first image path 315 and the second image capture device 320 captures images of the object 300 along a second image path 325. The third and fourth image capture devices 330, 340 receive images through the horizontal scanning window 235. The third image capture device 330 captures images of the object 300 along a third image path 335 and the fourth image capture device 340 captures images of the object 300 along a fourth image path 345.

The four image capture devices 310, 320, 330, 340 preferably may be implemented using a complementary metal oxide semiconductor (CMOS) image capture device. In some embodiments, the image capture devices are based on other technologies such as charged-coupled device (CCD) technology. The image capture devices 310, 320, 330, 340 capture an electronic image of the optical image directed to the device. The electronic image is captured in the form of digital image data that represents the value of the light received by each pixel of each image capture device 310, 320, 330, 340. In some embodiments, each of the image capture devices 310, 320, 330, 340 includes a lens that focuses images directed at the image capture devices 310, 320, 330, 340 onto the capture surface of the respective image capture devices 310, 320, 330, 340. It should be noted that dirt, a liquid, residue from a dried liquid, any type of foreign material or the like that adheres to the lens or any other optical surface in one of the image paths 315, 325, 335, 345 will degrade or prevent the respective image capture device 310, 320, 330, 340 from being able to read an optical code on the object 300.

Items to be scanned by the scanner 130 are passed through a target scanning area 305. The target scanning area 305 is a volume of space above the horizontal scanning window 235 and in front of the vertical scanning window 220. Optical codes that pass through the target scanning area 305 will be in the field of view of one or more of the image capture devices 310, 320, 330, 340. For example, an image of an object 300, located within the target scanning area 305, is received along the first image path 315 and captured by the first image capture device 310. Another image of the object 300 is received along a second image path 325 and captured by the second image capture device 320. The optical codes can be presented in either printed form or electronic form, for example, they can be displayed on an electronic display such as the display of a cell phone.

This embodiment depicts two scanning windows 220, 235. However, other embodiments of the invention may have only one scanning window or more than two scanning windows. Still other embodiments use a scan tunnel and the image capture devices are located within the scan tunnel. Other embodiments may suitably include two or three image capture devices or more than four image capture devices.

Figure 4:
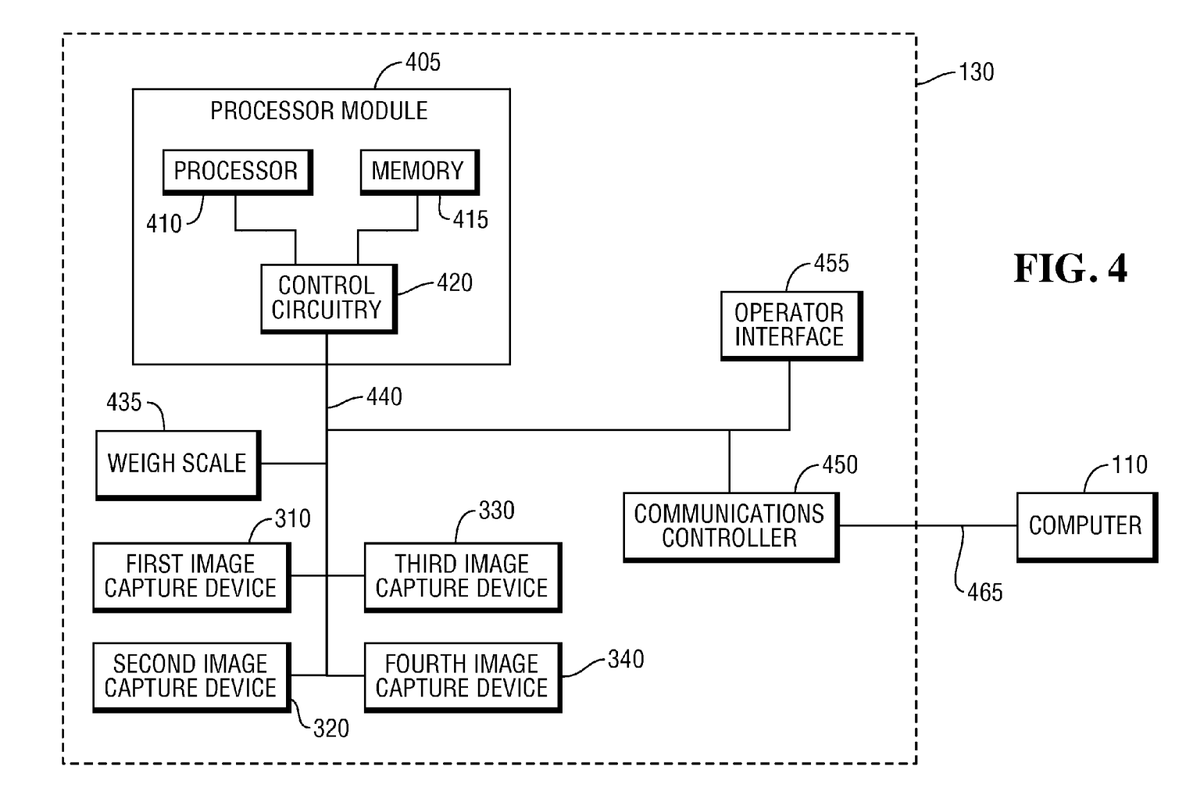
FIG. 4 is a high-level block diagram illustrating selected hardware components of the optical code scanner.

With reference to FIG. 4, there is provided a high-level block diagram illustrating an exemplar embodiment of certain hardware components of the scanner 130. The scanner 130 includes a processor module 405 which includes a processor 410, a memory 415, and control circuitry 420. The memory 415 is non-transitory and computer readable. The memory 415 includes both volatile and non-volatile memory. The non-volatile memory may suitably include solid state and rotating memory devices. The processor 410 executes computer instructions stored in the memory 415 which causes the processor 410 to control the components of the scanner 130 and to implement the features and functions of the scanner 130.

The control circuitry 420 includes hardware interfaces between the processor 410 and the memory 415 and between the processor 410 and a bus 440 used to communicate with other components of the scanner 130. The scanner 130 further includes an operator interface 455 and a communications controller 450. The bus 440 connects the processor 410 to the first image capture device 310, the second image capture device 320, the third image capture device 330, the fourth image capture device 340, the weigh scale 345, the operator interface 455 and the communications controller such that the processor 410 can communicate with and control each of the elements.

The communications controller 450 includes the hardware and software required for the scanner 130 to connect to and communicate over the network connection 465 to the computer 110. In some embodiments, the network connection 465 is implemented as a universal system bus (USB). In other embodiments, the network connection 465 is implemented as an RS-232 interface.

The operator interface 455 includes input devices, such as buttons and a speaker that produces audible sounds associated with different functions which are used to communicate information to the operator.

Figure 5:
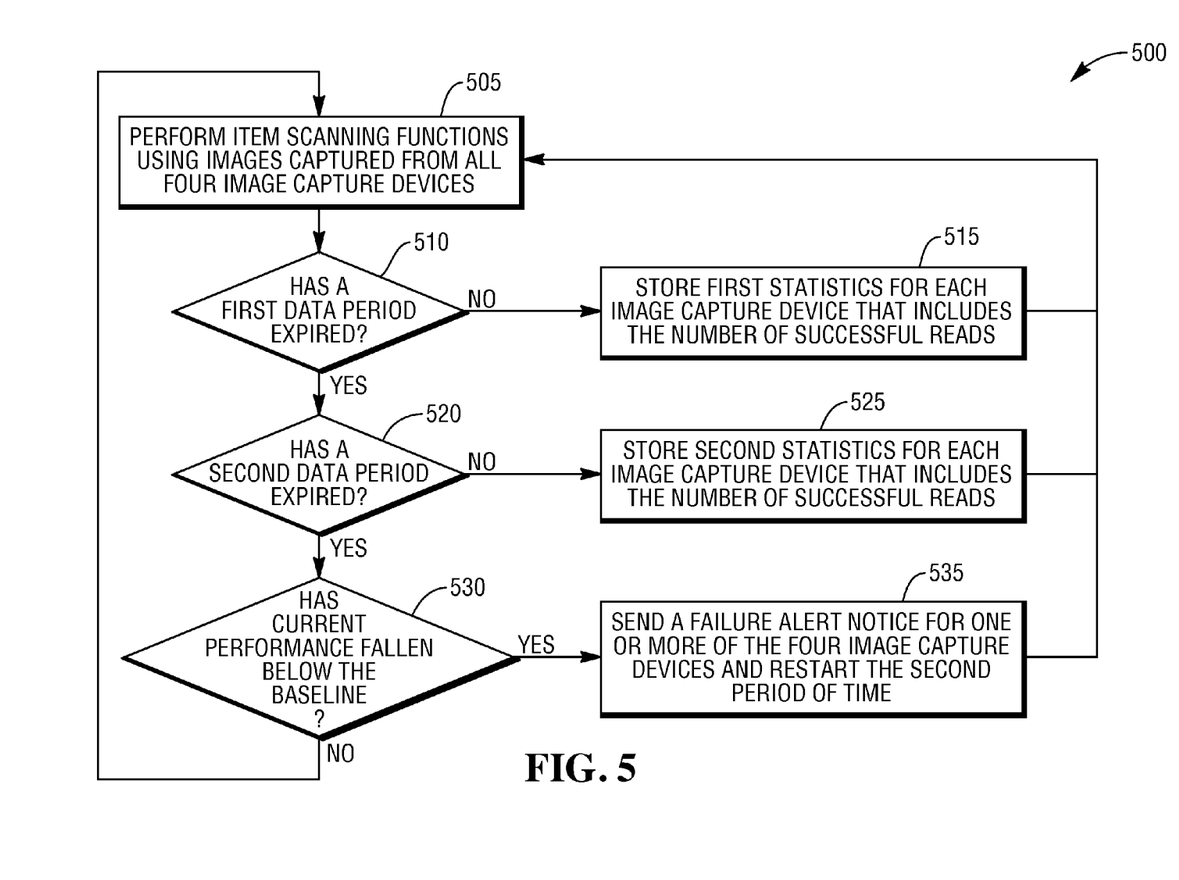
FIG. 5 is a high-level flow diagram illustrating a method of operating the optical code scanner.

Turning to FIG. 5, there is provided a high-level flow diagram illustrating a method 500 of operating the optical code scanner 130. The following method describes one embodiment of the optical code scanner 130 and one example method for operating it. The method described below is performed by the processor 410 in the optical code scanner 130.

In step 505, the processor 410 performs item scanning functions using images captured from all four image capture devices 310, 320, 330, 340. An item scanning function involves processing captured images received from each of the image capture devices 310, 320, 330, 340. When an optical code is decoded from a captured image, the decoded information for the optical code is transmitted over the network connection 465 to the computer 110.

In step 510, the processor 410 determines if a first data period has expired. The first data period is a period during which baseline statistics are gathered for each of the image capture devices 310, 320, 330, 340. If the first data period has not expired, control passes to step 515. Otherwise, control passes to step 520. If should be noted that a system administrator or a field service person can at any time enter a command that causes the processor 410 to start a new first data period so that new baseline statistics can be gathered. The processor 410 may start a new first data period to gather new baseline statistics at predetermined times such as daily or weekly. A system administer can set the predetermined time or turn off the feature which means the baseline statistics are only gathered once after the optical code scanner 130 is put into service.

In step 515, the processor 410 stores a first set of statistical data for each of the image capture devices 310, 320, 330, 340 during the first data period. The first set of statistical data form a set of baseline statistics for each of the image capture devices 310, 320, 330, 340. The baseline statistics include the total number of items scanned and the total number of items scanned by each of the image capture devices 310, 320, 330, 340. In some embodiments, the first data period is a predetermined period of time. The length of time for the first data period can be set to different values by a system administrator but it typically requires at least 1 hour of scanning operations. Scanning operations is the actual time spent performing a scanning operation. Scanning operations do not include idle time where the optical code scanner 130 is not performing an actual item scanning function where an item is detected and identified.

In other embodiments, the first data period is defined not by a predetermined period of time, but by the identification of a predetermined number of scanned items presented to the optical code scanner 130. The first data period ends when the number of scanned items reaches the predetermined number. The predetermined time or the predetermined items scanned number can be set by a system administrator to account for the type of retail environment the optical code scanner 130 is operating in or whether the optical code scanner 130 is operated by a customer or a cashier or a particular casher.

The first data period is designed so that sufficient data can be gathered to determine a statistically meaningful baseline for good item scans for each of the image capture devices 310, 320, 330, 340. The gathered data determines the average number of successful item scans performed by each of the image capture devices 310, 320, 330, 340. Additionally, the data is used to determine the average item read percentage for each of the image capture devices 310, 320, 330, 340. Each of the image capture devices 310, 320, 330, 340 is positioned so as to receive images from a different area of the scanning volume 305. The operator will generally present items in a consistent manor but there is always a certain amount of randomness associated with each item presentation. The randomness includes variations in the path and orientation of the item as it is moved across the optical code scanner 130 and the shape of each item and the location of an optical code on each item.

In some embodiments, when a high number of items are scanned, statistically each of the image capture devices 310, 320, 330, 340 will read an average of 25% of the scanned items. In other embodiments that use a different orientation for the image capture devices 310, 320, 330, 340, the first image capture device 310 reads an average of 10% of the items scanned while the other image capture devices 320, 330, 340 read an average of 30% of the items scanned. When all the image capture devices 310, 320, 330, 340 are operating properly, any baseline deviation from an equal distribution for the number of items scans is typically attributed to differences in the design of the optical code scanner 130 and the direction of the field of view for each of the image capture devices 310, 320, 330, 340.

In step 520, the processor 410 determines if a second data period has expired. The second data period is a period during which current statistics are gathered for each of the image capture devices 310, 320, 330, 340. If the second data period has not expired, control passes to step 525. Otherwise, control passes to step 530. The second data period is started after the first data period expires. The second data period is periodically started to take snap-shots of the performance of each of the image capture devices 310, 320, 330, 340.

In step 525, the processor 410 stores a second set of statistical data for each of the image capture devices 310, 320, 330, 340 while a second data period is active. The second set of statistical data provides a current snap-shot of the performance of each of the image capture devices 310, 320, 330, 340. The second data period is designed so that sufficient data can be gathered to determine a statistically meaningful snap-shot for each of the image capture devices 310, 320, 330, 340. The snap-shot data determines the average number of successful item scans performed by each of the image capture devices 310, 320, 330, 340 during the second data period. Additionally, the data is used to determine the average item read percentage for each of the image capture devices 310, 320, 330, 340.

In step 530, the processor 410 determines if the current performance of any of the image capture devices 310, 320, 330, 340 is below their baseline performance by a predetermined amount. If the performance of at least one of the image capture devices has declined by the predetermined amount below its baseline performance, control passes to step 535, otherwise control passes to step 505. The predetermined is sufficient to mask statistical noise and clearly show a real reduction in performance. The predetermined amount can be changed by a system administrator or a field service person.

In step 535, the processor 410 sends a failure alert notice that identifies the one or more image capture devices 310, 320, 330, 340 whose snap-shot performance has fallen below its baseline performance. A reduction in performance may indicate a partial reduction in performance or a complete failure. A partial or even a complete failure may be caused by foreign material blocking the field of view of the image capture device. The alert notice is transmitted externally to an operator and in some embodiments to a system administrator. The alert notice may cause the operator to clean the optical code scanner 130 or may cause a system administrator to schedule maintenance on the optical code scanner 130. After the failure alert notice is sent, the second data period is restarted on a periodic basis so that the processor 410 continues to capture a snap-shot of the current performance of the optical code scanner 130 and to detect additional failures or when an image capture device is restored to full function. In some embodiments, a new second data period is restarted immediately after the previous second data period ends. This approach provides continuous checking of the health of the image capture devices 310, 320, 330, 340.

Although the present invention has been described with particular reference to certain preferred embodiments thereof, variations and modifications of the present invention can be effected within the spirit and scope of the following claims.

What is claimed is:

1. A method implemented by a processor in an optical code scanner, the method comprising:
   reading optical codes on items presented to the optical code scanner using images captured from a plurality of image capture devices;
   storing a first set of statistics for each of the plurality of image capture devices when it is determined a first data period is active;
   starting a second data period after it is determined the first data period has expired;
   storing a second set of statistics for each of the plurality of image capture devices when it is determined the second data period is active; and
   transmitting a failure alert indication for a first of the plurality of image capture devices when the second set of statistics are below the first set of statistics for the first of the plurality of image capture devices by a predetermined amount.

2. The method of claim 1, wherein the first set of statistics include information on successful reads of optical codes by each of the plurality of image capture devices wherein the first statistics represent a baseline performance for each of the plurality of the image capture devices.

3. The method of claim 2, wherein the second set of statistics include information on successful reads of optical codes by each of the plurality of image capture devices wherein the second set of statistics represent a current snap-shot performance for each of the plurality of the image capture devices.

4. The method of claim 1, wherein the length of the first data period is a predetermined amount of time wherein time only accumulated during performance of successful item scans.

5. The method of claim 4, wherein the length of the second data period is a predetermined amount of time wherein time only accumulated during performance of successful item scans.

6. The method of claim 1, wherein the length of the first data period is the time required for the optical code scanner to perform a predetermined number of successful item scans.

7. The method of claim 6, wherein the length of the second data period is the time required for the optical code scanner to perform a predetermined number of successful item scans.

8. The method of claim 1, wherein the failure alert indication includes baseline and snap-shot performance information for the first of the plurality of image capture devices.

9. The method of claim 1, wherein the failure alert indication includes information indicating a partial or complete failure for the first of the plurality of image capture devices.

* * * * *